US010650391B2

(12) United States Patent
Yang et al.

(10) Patent No.: US 10,650,391 B2
(45) Date of Patent: May 12, 2020

(54) SYSTEM AND METHOD FOR DETERMINING POPULATION MOVEMENT

(71) Applicant: MASTERCARD INTERNATIONAL INCORPORATED, Purchase, NY (US)

(72) Inventors: Peng Yang, Sunnyvale, CA (US); Ravi S. Arvapally, O'Fallon, MO (US); Wally F. Lo Faro, Chesterfield, MO (US); Kamalesh V. Rao, Jackson Heights, NY (US)

(73) Assignee: Mastercard International Incorporated, Purchase, NY (US)

( * ) Notice: Subject to any disclaimer, the term of this patent is extended or adjusted under 35 U.S.C. 154(b) by 245 days.

(21) Appl. No.: 15/652,533

(22) Filed: Jul. 18, 2017

(65) Prior Publication Data
US 2019/0026757 A1    Jan. 24, 2019

(51) Int. Cl.
G06Q 20/00 (2012.01)
G06Q 30/02 (2012.01)
G06Q 20/20 (2012.01)
G06Q 20/34 (2012.01)
G06Q 20/32 (2012.01)

(52) U.S. Cl.
CPC ......... *G06Q 30/0201* (2013.01); *G06Q 20/20* (2013.01); *G06Q 20/3224* (2013.01); *G06Q 20/34* (2013.01)

(58) Field of Classification Search
None
See application file for complete search history.

(56) References Cited

U.S. PATENT DOCUMENTS

| 6,317,686 B1 * | 11/2001 | Ran ................ G01C 21/3691 701/117 |
| 7,155,402 B1 | 12/2006 | Dvorak |
| 8,484,151 B1 | 7/2013 | Lookingbill |
| 2005/0159996 A1 | 7/2005 | Lazarus et al. |

(Continued)

FOREIGN PATENT DOCUMENTS

| JP | 2012141953 A | * | 7/2012 | ............ G06Q 10/06 |
| JP | 2014232535 A | * | 12/2014 | ............ G06Q 10/08 |

OTHER PUBLICATIONS

PWC. Emerging Markets Driving the Payments Transformation. (Jul. 12, 2016). Retrieved online Dec. 23, 2019. https://www.pwc.com/gx/en/financial-services/publications/assets/pwc-emerging-markets-12-July.pdf (Year: 2016).*

(Continued)

*Primary Examiner* — James A Reagan
(74) *Attorney, Agent, or Firm* — Ohlandt, Greeley, Ruggiero & Perle, L.L.P.

(57) ABSTRACT

A system and a method that determine movement of one or more individuals or populations of individuals are provided. A residential zip code of an individual is determined. Long-term movements are identified. Short-term movements are identified. The long-term and short-term movements are classified. Anonymization removes personally identifying information of the individual. The short-term movements and long-term movements are aggregated by creating source-target zip code pairs. A population movement database is generated. The population movement database is accessible by a user device that has credentials allowing access.

18 Claims, 4 Drawing Sheets

(56) References Cited

U.S. PATENT DOCUMENTS

| | | | |
|---|---|---|---|
| 2006/0155628 A1 | 7/2006 | Horowitz | |
| 2012/0036013 A1* | 2/2012 | Neuhaus | G06Q 30/02 705/14.53 |
| 2012/0209658 A1 | 8/2012 | Shibayama et al. | |
| 2012/0221400 A1 | 8/2012 | Tietzen | |
| 2013/0067079 A1 | 3/2013 | Mourtada | |
| 2013/0197998 A1 | 8/2013 | Buhrmann et al. | |
| 2014/0136104 A1 | 5/2014 | Spears et al. | |
| 2014/0136414 A1 | 5/2014 | Abhyanker | |
| 2016/0092896 A1* | 3/2016 | Gerard | G06Q 30/0204 705/39 |
| 2016/0379327 A1* | 12/2016 | Bhatt | G06Q 50/265 705/7.29 |
| 2018/0181973 A1* | 6/2018 | Lynch | G06Q 20/322 |
| 2019/0026757 A1* | 1/2019 | Yang | G06Q 30/0201 |

OTHER PUBLICATIONS

United Nations. International Migration Report Highlights. (2017). Retrieved online Dec. 23, 2019. https://www.un.org/en/development/desa/population/migration/publications/migrationreport/docs/MigrationReport2017_Highlights.pdf (Year: 2017).*

* cited by examiner

SYSTEM AND METHOD FOR DETERMINING POPULATION MOVEMENT

BACKGROUND OF THE DISCLOSURE

1. Field of the Disclosure

The present disclosure relates to determining population movement. More particularly, the present disclosure relates to a system and a method for determining long and short-term movements of one or more individuals or populations of individuals.

2. Description of Related Art

Migration and population movement have been an important part of the human experience throughout history and continue to play an important role in shaping the populations of cities, states and regions. Population movements are responsible for the diffusion of culture and other socio-economic changes in cities, states and regions.

Surveys collect data at single point in time. It is difficult to measure changes in the population unless an additional survey is conducted at a subsequent point in time. Such repetition of surveys is expensive and time-consuming. Further, this methodology requires frequent periodic surveys, which is impractical. As an example, the United States conducts a census every ten (10) years. However, such a census is very costly and is outdated before completion since the population is in flux even while the survey is being conducted.

Accordingly, there is a need for a system and a method that provide a reliable, real time determination of population movement. A system and a method according to the present disclosure overcome these and other long felt needs.

SUMMARY OF THE DISCLOSURE

The present disclosure provides a system for determining population movement in real time.

The present disclosure also provides a system for determining population movement in real time using payment card transaction records.

The present disclosure further provides a system and a method for determining population movement using a plurality of payment card transaction records in which personal information is filtered out. The system includes determining a home zip code of a primary account number holder of a payment card and determining movement outside of the home zip code for a selected time period based on subsequent analysis of the payment card transaction records. The analysis of subsequent transactions records includes as factors merchant categories assigned to the transactions that are used to assess whether the movement is long-term or short-term.

These and other objects and advantages of the present disclosure are provided by a computer system and method that determine population movement from point of sale transaction data in which the payment card must be present. A residential zip code of the payment card holder is determined from a predetermined number of the most recent transactions, preferably the fifteen of most recent. Long-term and short-term movements of the payment card holder are identified from the transaction data based on certain characteristics. A long-term movement is characterized by constant transactions in a zip code other than the residential zip code over a predetermined period of time exceeding four weeks followed by transactions occurring in the residential zip code, a seasonal change of residential zip code that syncs up with an academic calendar, or a change of residential zip code. Short-term movements are characterized by transactions occurring in a zip code other than the residential zip code but without a change in the residential zip code. Anonymization removes the primary account number and any personally identifying information of the payment card holder from the transaction records. The short-term movements and long-term movements are aggregated by creating source-target zip code pairs. A population movement database is generated. The population movement database is accessible by a user device that has credentials allowing access.

The above-described and other features and advantages of the present disclosure will be appreciated and understood by those skilled in the art from the following detailed description, drawings, and appended claims.

DETAILED DESCRIPTION OF THE DISCLOSURE

As used herein, payment card transactions are those transactions conducted at a merchant's point of sale and for which the cardholder is present. Payment cards include debit, credit, charge, pre-pair or stored value, and the like. A point of sale device is any device that stores, processes, and transmits cardholder data to effectuate a financial transaction at a merchant establishment. Brick and Mortar refers to a physical presence of a building for shoppers to visit and conduct purchase transactions.

Figure 1:
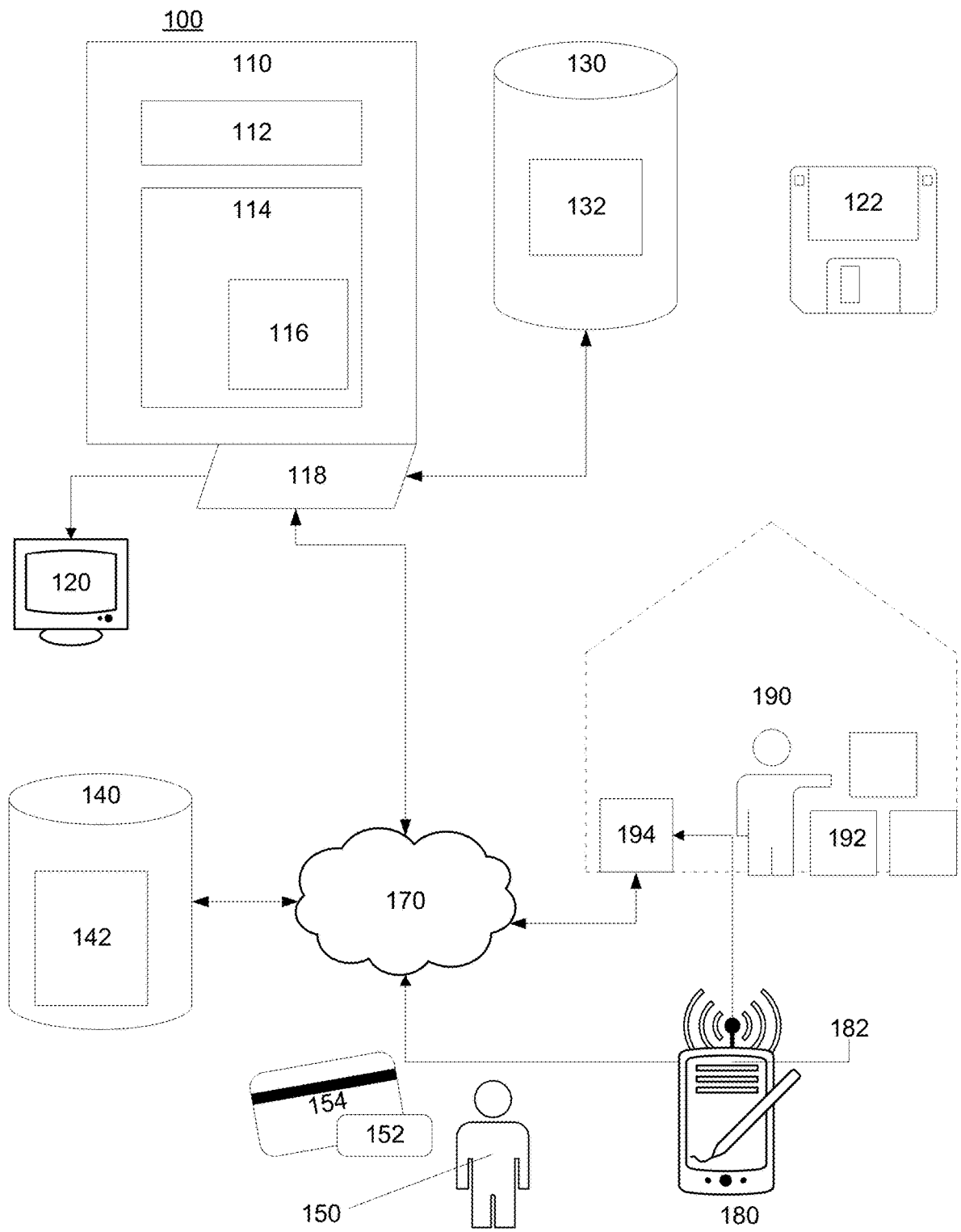
FIG. 1 is a system diagram according to the present disclosure.

Referring to the drawings and in particular to FIG. 1, there is shown a system 100 according to the present disclosure. System 100 includes a computer 110, a database 130, a data warehouse 140, a user device 180 of a user that is a primary account holder 150, and a merchant point of sale device 194 (POS 194). POS 194 is that of a merchant 192 at a storefront 190. Computer 110, database 130, data warehouse 140, user device 180 and POS 194 are each communicatively coupled to a network 170, e.g., the internet. Communications to and from network 170 are conducted using electronic or optical signals.

Computer 110 includes a processor 112, and a memory 114 coupled to the processor. Computer 110 can be a stand-alone device, but is not limited to such. Computer 110 can, instead, be coupled to other devices via a local network (not shown) or via network 170, in a distributed processing system.

Computer 110 also has an input/output interface 118 (hereinafter "I/O" 118.). I/O 118 can receive input from devices including a keyboard, a mouse, a scanner, a database, a storage device, a network interface card for communicating with network 170, and any other device or interface for providing an input to computer 110. I/O 118 can also output to devices, such as, a display 120, a printer, a database, a storage device, a network interface card for communicating with network 170, and any other device or interface to which computer 110 can output. A connection to network 170 via a network card, for example, is both an input and an output.

Processor 112 is an electronic device configured with logic circuitry that responds to and executes instructions.

Memory 114 is a tangible computer-readable storage device. In this regard, memory 114 stores data and instructions, i.e., program code, that are readable and executable by processor 112 for controlling the operation of the processor. Memory 114 can be implemented in a random access memory (RAM), a hard drive, a read only memory (ROM), or a combination thereof. One of the components of memory 114 is a program module 116.

Program module 116 has instructions for controlling processor 112 to perform a method for determining population movement as described herein.

The term "module" is used herein to denote a functional operation that can be embodied either as a stand-alone component or as an integrated configuration of a plurality of subordinate components. Thus, the program module can be implemented as a single module or as a plurality of modules that operate in cooperation with one another. Moreover, although the program module is described herein as being installed in memory, and therefore being implemented in software, it could be implemented in any of hardware (e.g., electronic circuitry), firmware, software, or a combination thereof.

While program module 116 is indicated as being already loaded into memory, it can be configured on a storage device 122 for subsequent loading into memory. Storage device 122 is a tangible computer-readable storage device that stores a version of the program module thereon. Examples of storage device include, but are not limited to, a compact disc, a magnetic tape, a ROM, an optical storage media, a hard disk drive, a solid state drive, a memory unit consisting of multiple parallel hard drives, and a universal serial bus (USB) flash drive. Alternatively, the storage device can be a random access memory, or other type of electronic storage device, located on a remote storage system and coupled to the computer via network 170.

As discussed above, system 100 also includes at least one transaction database 130 that is communicatively coupled to computer 110. Database 130 is a population movement database. Database 130 has records therein. Each record stores and identifies information 132 as described in the present disclosure. Database 130 can be more than one separate database and on more than one storage device. Database 130 can be a relational database, a graph database, and the like.

System 100 also includes a user device 180 and other user interfaces coupled to computer 110. User device 180 has a display 182. User device 180 can display an output of computer 110. Exemplary embodiments of user devices 180 and interfaces that can be used with the present disclosure can include desktop or laptop computers, mobile telecommunications devices, and the like.

Data warehouse 140 is a central repository of data that is created by storing certain transaction data resulting from payment card transactions occurring at a merchant POS 194. Data warehouse 140 stores, for example, the primary account number, date, time, amount, location (including a zip code of the merchant), merchant code, and merchant category for every transaction occurring within a payment card network. As used herein, and known in the art, a primary account number (PAN) is a 14, 15 or 16-digit number that appears on a primary account holder's payment card and that uniquely identifies the primary account holder's account and, thus, a primary account holder 150. These identifications are temporary and are not to be permanently stored.

Primary account holder 150 has a PAN 152 associated with a payment card 154. Payment card 154 is a device that enables a card holder, such as, primary account holder 150 to make a payment by electronic funds transfer. Payment card 154 is electronically linked to an account, PAN 152. Examples of payment card 154 include charge cards, credit cards, stored value cards, automated teller machine (ATM) cards, check cards, gift cards and debit cards.

Payment card 154 can include a magnetic stripe that stores card data. Payment card 154 can be read by a reading head of a POS device, an integrated circuit or chip that is embedded with card data and can be read by a POS device that enables such technology, Payment card 154 also includes programmable payment cards and electronic payment devices that have a near field communication (NFC) hardware and protocols. For example, user device 180 has a payment card application that has been programmed for PAN 152 and can be used at POS 194.

Storefront 190 is a brick and mortar business distinguishable from e-commerce businesses. Storefront 190 includes the physical presence of a building for shoppers to visit and conduct purchase transactions. POS 194 is physically located in or at storefront 190. POS 194 is any merchant device that enables a retail transaction using payment card 154 to be completed.

The transactions of the present disclosure used to determine population movement include only card-present transactions and exclude all card-not-present (CNP) transactions, all mail order transactions, all telephone order transactions, and all internet based transaction. Card-present refers to the payment instrument or payment card 154 that is in the same physical location as POS 194.

Figure 2:
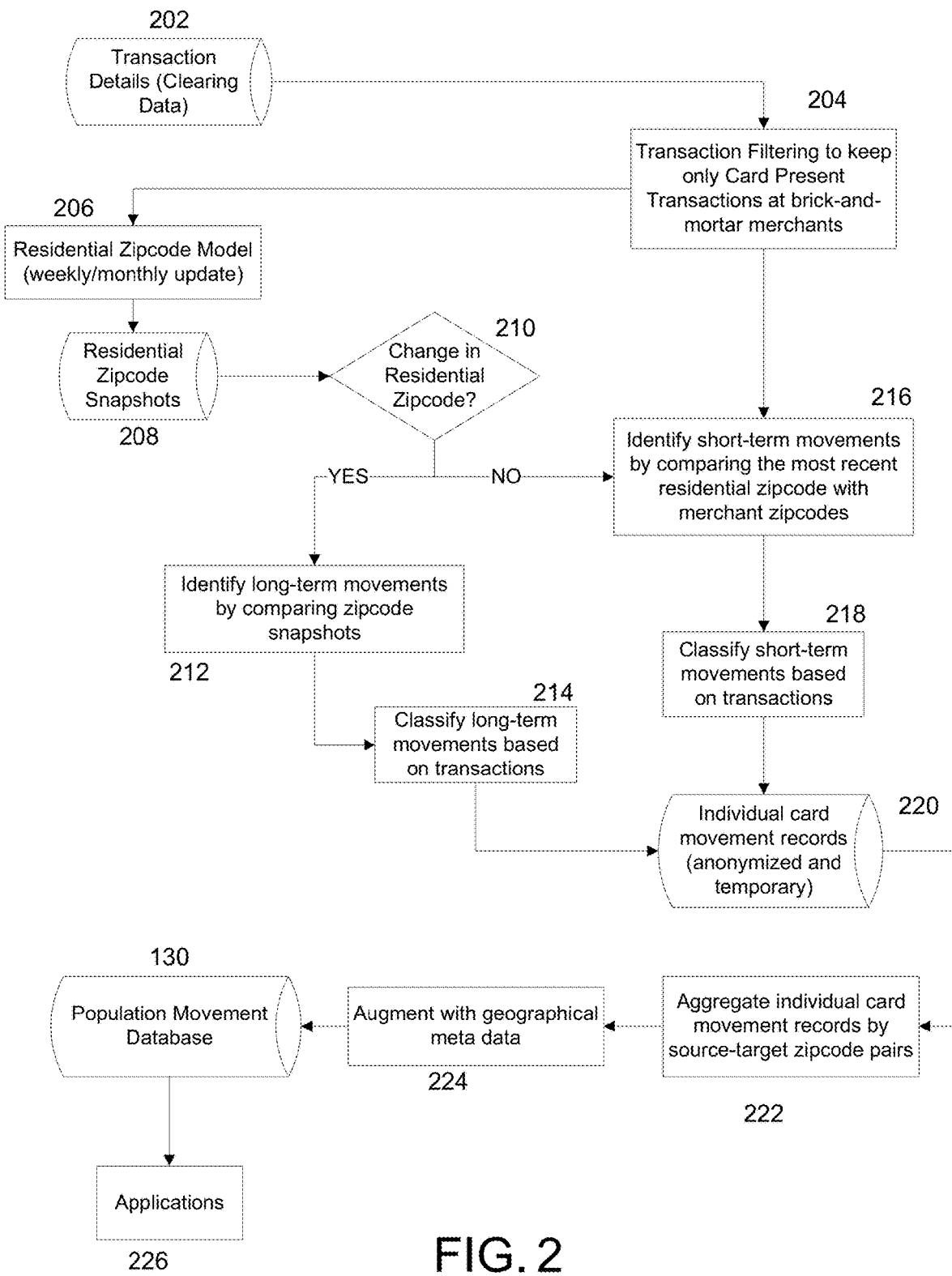
FIG. 2 is a process flow chart for the system and the method according to the present disclosure.

Referring to FIGS. 1 and 2, at 202, transaction details or clearing data are transmitted from POS 194 to data warehouse 140 and stored as part of payment card transaction records 142. The transaction details include both card-present and card-not-present transaction data.

System 100 accesses data warehouse 140 and retrieves payment card transaction records 142 for PAN 152. Transaction records 142 can be a copied and stored in database as transaction records 132.

Referring to FIG. 2, at 204, the card-present filter removes or filters out card-not-present transactions from transaction records. Thus, only card-present transactions conducted at storefront 190 remain. This is especially important in view of the many remote transactions that often occur, such as online shopping. Card-not-present is not literal, as transactions processed at contactless points of sale using, for example, a NFC device are considered card-present. Thus, card-present means any transaction at storefront 190 and is not dependent on the mode of the transaction.

It is important that only card-present transactions be analyzed since the present disclosure is concerned with population movement. Population movement cannot be determined from remote transactions. Accordingly, only transactions at brick and mortar based merchants or storefronts 190, and not online stores, are considered and remain after the card-present filter is applied.

The transaction history of PAN 152 in FIG. 1 is analyzed for a specified time period. The specified time period can be provided by input 118, user device 180, or be a default period such as a day, a week, a month, a year, and any combination thereof.

For the system and the method of the present disclosure, the determination of a residential or home zip is important. Each transaction of the cardholder is analyzed to determine merchants, merchant categories and zip codes of the merchant establishments where the cardholder performed a transaction. For each determined zip code, the quantity of conducted transactions is tabulated. The zip code in which the largest quantity of transactions occurred is considered the residential or home code.

Referring again to FIG. 2, at 206, a residential zip code is determined from transaction records 132 shown in FIG. 1. It is important that transaction records 132 do not include personally identifying information, such as a person's name or address, including the person's residential zip code. Transaction records 132 indicate a zip code in which a transaction has been conducted. Thus, a residential zip code of primary account holder 150 is not known and, contrary to accepted and conventional routine, must be determined from payment card transaction information. An example follows.

Zip codes from the fifteen (15) most recent transactions in a selected list of industries are retained in a zip vector. Each zip code is assigned a weighting factor. The weighting factor is a function of the industry in which the corresponding merchant engages. These weights are summed over each common zip code in the zip vector. The zip code with the highest score is selected as the residential zip code.

The zip vector is simply an ordered list of fifteen zip codes, the order being chronological. The zip codes are merchant zip codes where a transaction occurred. Every time the account transacts at a merchant in a predetermined list of industries that merchant's zip code goes to the front of the zip vector and the oldest merchant zip code falls off or goes to the back.

In the zip vector that follows, transactions occurred in sixteen (16) unique zip codes of payment card transactions chronologically ordered, $z1$ to $z16$. Only the most recent transactions codes are used, $z1$ to $z15$.

($z1$, $z2$, $z3$, $z4$, $z5$, $z6$, $z7$, $z8$, $z9$, $z10$, $z11$, $z12$, $z13$ $z14$, $z15$, $z16$).

The list of industries from which transactions are selected include: dry cleaning, laundry services (DLS), death care services (DSC), video and game rentals (VGR), grocery stores (GRO), beer/wine/liquor stores (BWL), veterinary services (VES), automotive fuel (AFS), cosmetics and beauty services (COS), elementary, middle, high schools (EHS), maintenance and repair services (MRS), courier services (CSV), specialty food stores (GSF), automotive retail (AUT) and discount department stores (DIS).

Each industry has an assigned weight. The weight is simply the empirical probability that a transaction in a given industry occurs in the primary account holder's residential zip code.

The weighted value is determined from the merchant category. Certain merchant categories are weighted as zero and therefore excluded. These merchant excluded categories include those listed in Table 1 below.

TABLE 1

| CODE | INDUSTRY NAME |
|------|---------------|
| AAC | Children's Apparel |
| AAF | Family Apparel |
| AAM | Men's Apparel |
| AAW | Women's Apparel |
| AAX | Miscellaneous Apparel |
| ACC | Accommodations |
| ACS | Automotive New and Used Car Sales |

TABLE 1-continued

| CODE | INDUSTRY NAME |
|------|---------------|
| ADV | Advertising Services |
| AFH | Agriculture/Forestry/Fishing/Hunting |
| ALS | Accounting and Legal Services |
| ARA | Amusement, Recreation Activities |
| ART | Arts and Crafts Stores |
| AUC | Automotive Used Only Car Sales |
| BKS | Book Stores |
| BMV | Music and Videos |
| BNM | Newspapers and Magazines |
| BTN | Bars/Taverns/Night clubs |
| CCR | Consumer Credit Reporting |
| CEA | Consumer Electronics/Appliances |
| CES | Cleaning and Exterminating Services |
| CGA | Casino and Gambling Activities |
| CMP | Computer/Software Stores |
| CNS | Construction Services |
| CPS | Camera/Photography Supplies |
| CTE | Communications, Telecommunications Equipment |
| CTS | Communications, Telecommunications, Cable |
| CUE | College, University Education |
| CUF | Clothing, Uniform, Costume Rental |
| DAS | Dating Services |
| DPT | Department Stores |
| DSC | Drug Store Chains |
| DVG | Variety/General Merchandise Stores |
| EAP | Eating Places |
| ECA | Employment, Consulting Agencies |
| EQR | Equipment Rental |
| ETC | Miscellaneous |
| FLO | Florists |
| FSV | Financial Services |
| GHC | Giftware/Houseware/Card Shops |
| HBM | Health/Beauty/Medical Supplies |
| HCS | Health Care and Social Assistance |
| HFF | Home Furnishings/Furniture |
| HIC | Home Improvement Centers |
| INS | Insurance |
| IRS | Information Retrieval Services |
| JGS | Jewelry and Giftware |
| LEE | Live Performances, Events, Exhibits |
| LLS | Luggage and Leather Stores |
| LMS | Landscaping/Maintenance Services |
| MAS | Miscellaneous Administrative and Waste Disposal Services |
| MER | Miscellaneous Entertainment and Recreation |
| MES | Miscellaneous Educational Services |
| MFG | Manufacturing |
| MOS | Miscellaneous Personal Services |
| MOT | Movie and Other Theatrical |
| MPI | Miscellaneous Publishing Industries |
| MPS | Miscellaneous Professional Services |
| MTS | Miscellaneous Technical Services |
| MVS | Miscellaneous Vehicle Sales |
| OPT | Optical |
| OSC | Office Supply Chains |
| PCS | Pet Care Services |
| PET | Pet Stores |
| PFS | Photofinishing Services |
| PHS | Photography Services |
| PST | Professional Sports Teams |
| PUA | Public Administration |
| RCP | Religious, Civic and Professional Organizations |
| RES | Real Estate Services |
| SGS | Sporting Goods/Apparel/Footwear |
| SHS | Shoe Stores |
| SND | Software Production, Network Services and Data Processing |
| SSS | Security, Surveillance Services |
| TAT | Travel Agencies and Tour Operators |
| TEA | T + E Airlines |
| TEB | T + E Bus |
| TET | T + E Cruise Lines |
| TEV | T + E Vehicle Rental |
| TOY | Toy Stores |
| TRR | T + E Railroad |
| TSE | Training Centers, Seminars |
| TSS | Other Transportation Services |
| TTL | T + E Taxi and Limousine |
| UTL | Utilities |
| VTB | Vocation, Trade and Business Schools |

TABLE 1-continued

| CODE | INDUSTRY NAME |
| --- | --- |
| WAH | Warehouse |
| WHC | Wholesale Clubs |
| WHT | Wholesale Trade |

A standard mode is simply a sum of the one (1) numbers. Number 1 is for each occurrence of a particular event. In the above context, the events are transactions in individual zip codes. Rather than summing the 1's, the industry weights corresponding to each zip code are summed.

For PAN 152, an exemplary zip vector is (z1, z2, z1, z3, z4, z5, z1, z4, z4, z1, z1, z5, z4, z3, z4). The corresponding industries are (AFS, GRO, DLS, AFS, AFS, BWL, VGR, MRS, GRO, AFS, DSC, GRO, DSC, AFS and BWL). The weight vector is (0.368, 0.334, 0.428, 0.368, 0.368, 0.335, 0.355, 0.365, 0.334, 0.368, 0.355, 0.334, 0.355, 0.368 and 0.335).

For each zip, the score is computed as
$Z1 = 0.368 + 0.428 + 0.355 + 0.368 + 0.355 = 1.874$
$Z2 = 0.334$
$Z3 = 0.368 + 0.368 = 0.736$
$Z4 = 0.368 + 0.365 + 0.334 + 0.335 + 0.355 = 1.757$
$Z5 = 0.335 + 0.334 = 0.669$ Accordingly, since z1 has the highest score, z1 is determined to be the residential zip code. In the rare event that two zip codes have the same score, the tie is resolved by assigning the zip code having the most recent transaction of the two tied zip codes as the residential zip code. This assignment is referred to herein as the stage 1 zip code assignment.

Further refinement to the stage 1 zip code assignment can follow. Two of these refinements are discussed below.

One refinement of the stage 1 zip code assignment uses an expanded zip code system that is called zip+4, often called "plus-four codes", "add-on codes" or "add ons". A zip+4 code uses the basic five-digit zip code plus four additional digits to identify a geographic segment within the five-digit zip code area, such as a city block, a group of apartments, and the like. This refinement is referred to herein as the stage 2 zip+4 zip code refinement. The other refinement that will be discussed later is similar, however it only uses the standard five-digit zip code and is referred to herein as the stage 2 zip5 zip code refinement.

In the stage 2 zip+4 zip code refinement, a centroid of zip codes from the zip vector used to determine stage 1 zip code assignment is selected.

For example, a 10-mile radius from the stage 1 zip code centroid is used to determine if a zip vector component would be used in calculating the centroid. The centroid itself is a simple average of latitude and longitude. The zip+4 centroid nearest to the transaction centroid is looked up in a reference Table having 27,172,733 entries.

Preferably, the Table has a compound index based on latitude and longitude. Prior to performing a nearest-neighbor search in this Table, the subset consisting of only the records in a taxicab radius are selected. This selection is performed taking advantage of the index so only the relevant records are read.

A revised residential zip code assignment is obtained by dropping the last four digits, i.e., the add-on codes of the zip+4 centroid, and thus yielding the stage 2 zip+4 zip code refinement.

As previously mentioned, the other refinement uses the five-digit zip code without the add-on codes. Advantageously, the Table used for this stage 2 zip5 zip code refinement has only 41,373 records. Statistical results are discussed later.

In sum, the home zip of PAN 152 is derived by ranking all the zip codes that appear for PAN 152 and selecting the zip code with the largest quantity of transactions as tabulated using the weighted values. Step 206, determines the residential zip code that can recur and updates on a weekly, monthly, quarterly, and yearly basis.

At step 208, snapshots or copies of the residential zip code are taken at various points in time for later comparison with a later taken snapshot.

It should thus be apparent that historical home zips can be determined by further filtering transaction records 132 for a specified time period. This is useful for determining the geographical origin of a present population.

Once the home zip has been determined, it is possible to determine population movements. The time span of population movement can be classified into two first level categories, long-term and short-term movements. Population movement is determined by a change in the home zip between a first time and a second, subsequent time at step 210.

If there is a change in residential zip code, then, at 212, long-term movements are identified by comparing snapshots.

At 214, long-term movements are further classified into second level categories, such as a long vacation, a change of residence and education. A long vacation is characterized by constant transactions in a new zip code, but a subsequent return to transactions at an original residential zip code. A change of residence is characterized by a change of residential zip code followed by a new zip code that remains constant for a period of time. The period of time ranges from one week to one month, or more. Educational movement is characterized by a seasonal change of residential zip code that syncs up with an academic calendar. During the academic calendar, there is high spending on school supplies, tuition, books and the like.

Long-term movements are determined when the home zip of PAN 152 changes between two snapshots in time, $T_0$ and $T_1$. See Example 1 in the Table 2 below. The time between $T_0$ and $T_1$ is preferably at least 30 days, more preferably 45 days, and most preferably 60 days.

If there is no change in residential zip code, then at 216, short-term movements are identified by comparing snapshots.

At 218, short-term movements are further classified into second level categories, such as tourism, a business trip and intra-day movement. Tourism is characterized by transactions that occur in areas different from the residential zip code. Often, the type of payment card used is a consumer payment card. A business trip is characterized by transactions in areas different from the residential zip code. Often, the type of payment card used is a business payment card. Intra-day movement is characterized as recurring spending in a zip code different from one's home zip code with frequent spending and places to eat on weekdays or spending in nearby zip codes on weekends.

Short-term movements are determined when the home zip of PAN 152 does not change between $T_0$ and $T_1$, and there are other zip codes in which PAN 152 has shopped. The time between $T_0$ and $T_1$ is preferably at least 2 weeks, more preferably 1 week, and most preferably 3 days. See Example 2 in Table 2 below.

TABLE 2

| | PAN | zip code $T_0$ | zip code $T_1$ | Intervening zip codes between $T_0$ and $T_1$ |
|---|---|---|---|---|
| Example 1 | 152 | 63130 | 94101 | none |
| Example 2 | 152 | 63130 | 63130 | 63130, 63017, 33101 |

The zip code at $T_0$, the home zip, is the source. The zip code at $T_1$ is the target destination. In Example 1, based on transaction records 132, there were no zip codes shopped at between $T_0$ and $T_1$. Thus, the target, zip 94101, is a long-term move. In Example 2, there are three zip codes shopped at between $T_0$ and $T_1$, namely 63130, 63017, and 33101. One of the three, 63130, is the home zip. There is no movement. The remaining two, 63017 and 33101 indicate short-term movement because at $T_1$, there was no change in home zip.

Zip code 33101 can be indicative of tourism or a business trip if, for example, the merchant categories (Table 1) are related to recreation, travel agency, vehicle rental, transportation, and the like. Zip code 63017 can be indicative of a weekend shopping trip if, for example, the merchant categories (Table 1) are related to shopping and apparel.

Type of movement is also determinable by taking a distance between two zip codes and a time between a first transaction and a second transaction. For example, a person might move from a home zip to a zip that is known to be in common with a university. A distance of 100 or more miles from the home zip, combined with a certain time period, would be indicative of a long-term move. In another example, a person might visit parents on weekends, about 200 miles from the home zip. This short (weekend) time period, combined with the 200 mile distance, is indicative of a short term move.

After aggregating all counts, a network of zip codes is built, with directed links connecting them. The property of the links includes the categories and various counts (# of unique cards, # of transactions).

Figure 3:
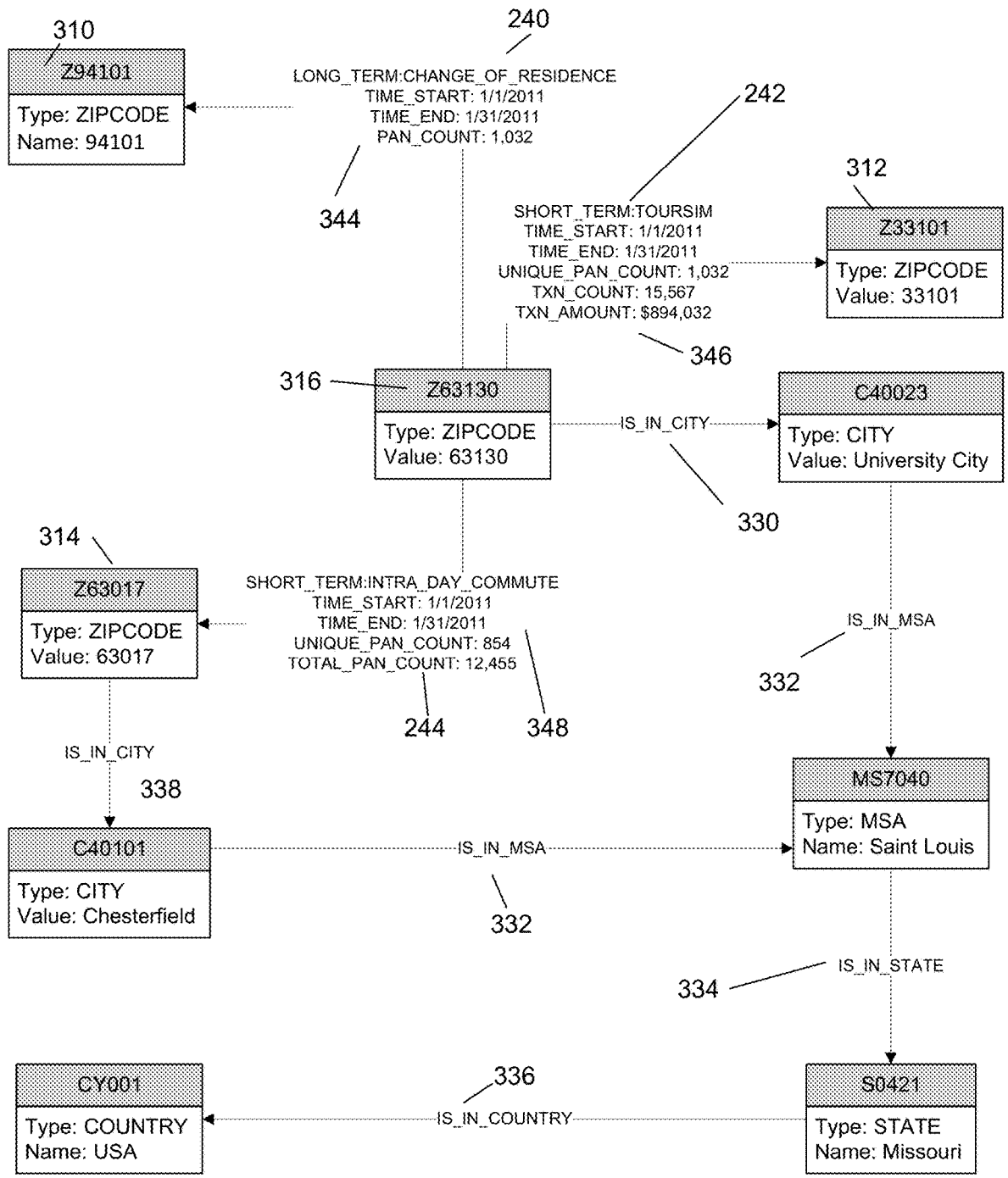
FIG. 3 is a schematic of an exemplary data structure used by the system of FIG. 1.

Referring to FIG. 3, the numbers and data shown are for illustrative purposes only. The four zip codes from above Table 2 are shown, namely 94101, 33101, 63017, and 63130, being zip 310, zip 312, zip 314, and zip 316 respectively.

As shown, zip 316 is linked to other data types. Link 330 links zip 316 to a particular city, link 332 links the particular city to a metropolitan area, link 334 links to a state, and link 336 links the state to a country. Zip 314 has link 338 that links zip 314 to a different city, but to the same metropolitan area as zip 316 by link 332. Zip 316 is linked by 344 to zip 310 indicating a long-term change of residence. Zip 316 is also linked by 346 to short-term tourism in zip 312. Although shown as city, state, metropolitan area and country, other links are possible.

Nodes 240, 242 and 244, include transaction based properties derived from transaction records 132. For example, these properties include transaction count/amount happened in the zip code, transaction count/amount by cardholders living in the zip code, unique PANs in the zip code, and the like.

The data structures shown in FIG. 3 are in a graph database format, but can also be in other database formats. For example, in a relational database, there could be a node Table, an edge Table, a location hierarchy Table, etc. The edge Table would have fields for a FROM_ZIPCODE, TO_ZIPCODE, CATEGORY_LV_1, CATEGORY_LV_2, TIME_START, TIME_END, UNIQUE_PAN_COUNT, TXN_COUNT, TXN_AMOUNT and the like. FROM_ZIPCODE is the home zip. TO_ZIPCODE is the target. CATEGORY_LV_1 is the first level category discussed above, while CATEGORY_LV_2 is a second level category. TIME_START is the time of the first record, while TIME_END is the time of the last record. UNIQUE_PAN_COUNT is a count of how many different PAN's transacted in the specified time period. TXN_COUNT is the total count of transactions conducted. TXN_AMOUNT is the monetary value of a given transaction.

The transaction based properties shown at nodes 240, 242 and 244 can be organized in at least one of the following ways. An array of numbers can be used to keep track of aggregated numbers, for example, an array of length 36 to track 3 years of monthly numbers. Alternatively, or in addition, an exponentially decaying function can be used to keep track of one number that emphasizes more on recent transactions and less on older transactions By using postal code data, the numbers can be aggregated to different geographical levels (neighborhood, city, metro area, state). Additional filters can be employed to filter out movements that are not of interest for specific applications. Criteria for filtering include time of year, or type of PAN, i.e. personal or corporate. For example, when analyzing destinations for travel, the postal code data can be used to exclude movements within a city. For example, movement from 63130 to 63017 is in the St. Louis metro area. These zip codes are filtered out since they are in the vicinity of the home zip and thus, not indicative of a short-term movement or a long-term movement.

Movements can be determined on a weekly, monthly, quarterly, or yearly basis.

Privacy is a concern and data anonymization intends to protect privacy. Transaction records 132 have information that is highly confidential and must be maintained confidential to prevent fraud and identity theft. Specifically, names and phone numbers, and the like must be maintained confidential. Therefore, they should be removed before being used in the present system and/or method.

At 220, an anonymizing filter removes personally identifying information of primary account holder 150 from transaction records 132. The transaction records stored in database 130 can be anonymized by using an anonymizing filter that removes or encrypts as hash data the confidential information, but retains records concerning all other transaction related details discussed above, preferably in real time.

Anonymized data is generally necessary for marketing applications. However, the PAN and zip combinations are necessary to extract information before aggregation. Again, these combinations are temporary and are not stored permanently. PAN-level identifiers are not included in database 130. Therefore, the final product does not track the activity of individual PANs 152.

At step 222, source target zip code pairs are aggregated. An example of a source target zip code pair is shown in FIG. 3 as zip 316 and zip 310.

At step 224, source target zip code pairs are augmented with geographical metadata as shown in FIG. 3 at node 240.

Zip codes that are known to be non-residential can also be filtered out from the transaction records 132.

Database 130 is a population movement database that is created and accessible by user device 180 to enable various applications 226.

Applications 226 are stored in a memory such as memory 114 or in storage device 122 or as part of program module 116. Applications 226 has a software code that sends a request to database 130. The request is converted by the database into a query against database 130. Application 226 then receives results of the query. Applications 226 will now be discussed by way of non-limiting examples.

In a first example, transaction records 132 can be used to generate a heat map showing population movement and trends. A heat map can be displayed on user device 180. Alternatively, a heat map be generated and printed.

In a second example, transaction records 132 can be used to generate a time lapse video. The time lapse video will show population movement for display on user device 180.

In a third example, transaction records 132 can be used to generate an alert when a threshold population change in a given geographic area occurs. The alert can be an email, a text message, a phone call and the like.

Determining population movement in accordance with the present disclosure has numerous uses.

For example, research institutes, including universities, research funding organizations and non-profit organizations, can use population movement data for socio-economic related research. For a specific example, The National Institute of Health can be interested in studying the determinants and consequences of movement trends.

Governments can use the population movement data for identifying problems that cause people to move. This information is incredibly helpful to estimate the potential growth/decline of the city they manage. Clearly, this information will assist in policy-making and urban planning. Government can also organize its resources, such as number of hospitals, fire stations, and the like, based on the population in its county/city. This is extremely useful since population often changes. Government can also correlate the population movement with other factors, e.g., crime rates, pollutions, and the like and, therefore, take appropriate corresponding action.

The population movement data also has business uses. For example, short-term movements can help airlines, hotels, travel agents and the like, obtain a better understanding of where people travel, when they travel, and what are the travel trends.

As another example, long-term movements can help real estate agents to understand the trends of people moving and guide the investments, or help insurance companies decide insurance premiums.

The term "trends" as used herein means the change in patterns of population movement over time. The above discussed data structures keep track of the movements in different time ranges. For example, the population movement data can show that 2 years ago people traveled to Old City for Christmas, whereas at the present time, the population movement data shows that people are now traveling to New City for Christmas, or there's an increasing number of people moving towards a western, revitalized part of Old City, or even simply leaving the city.

Population movement data for short-term movements, such as an intra-day movement like a commute to work could be used to study city infrastructure and facilities needs with respect to commuters. In this example, database 130 includes transaction records for cardholders who have spending patterns in different zip codes based on time. For example, a card holder buying coffee at a gas station before starting to work every day, buying lunch at a different zip code, and many more. Without wishing to be bound by a particular theory, it has been found that cardholders spend more at merchants located in a zip code wherein the cardholder lives and works. Based on both time-stamp and the zip code of transactions, a place of work and a place of residence can be determined.

Figure 4:
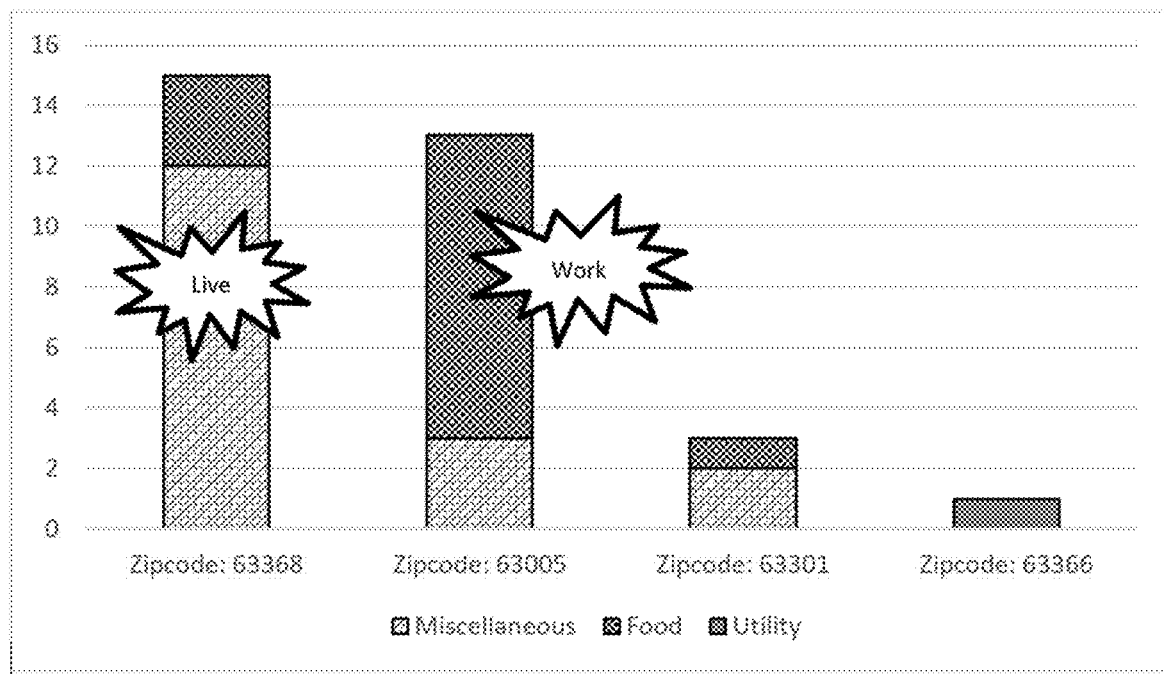
FIG. 4 is a distribution of payment card transaction counts by zip code.

FIG. 4 shows the frequency of transactions based on zip codes for certain period of time and categorized based on industry code or type of merchant. By the distribution of transaction counts by merchant category, it is determined that zip code 63368 is a place of residence and zip code 63005 is a place of work.

Here, the data is categorized into miscellaneous, food and utility. Based on the industry code of a merchant involved in transaction, transaction records 132 can be categorized into either food related, utility or miscellaneous. Miscellaneous includes gas-stations, dry-cleaners and the like.

By including transaction records with a utility merchant, the zip code of residence can be determined. In FIG. 4, utility falls under zip code 63366, which is closer to 63368 than 63005. Since the utility itself is close to 63368, then the card holder lives in 63368. The timing of those transactions can be considered as well. By performing this for every card holder in a certain city/town, one can study different combinations of zip codes where people live and work. Government can also use this information to study how citizens commute.

Consumers use gas-stations, restaurants, and the like based on their location, ease of access and many other factors. When merchants set up businesses, they take a population of an area (zip code) into account. As new businesses and more population move into the area, the real estate market has an impact. The population movement and new business in an area are very dynamic and depend on several factors. However, these factors do have an impact on the real estate market to a large extent. The real estate stakeholders are always interested to know the population movement dynamics that assists them in making informed decisions.

By assuming that subsequent to a first point in time more people live in a zip code, and higher total transaction amounts across all merchants in that same zip code occur than prior to that first point in time, then real estate prices, such as cost of a house, rental prices, and the like, will also be higher subsequent to that first point in time. The combination of population movement information and total transaction amounts given in a zip code could be valuable information to stakeholders involved in real estate business.

Experimental results from stage 1 and stage 2 discussed above are reproduced in the tables below.

Accuracy is shown in Table 3 below.

TABLE 3

| Model | Accuracy Rate |
| --- | --- |
| 1-Stage | 37.83% |
| 2-Stage Zip + 4 | 32.30% |
| 2-Stage Zip5 | 27.65% |

Remapping Accuracy is shown in Table 4 below

TABLE 4

| | 2-Stage Accurate Zip5 | | 2-Stage Accurate Zip5 | |
| --- | --- | --- | --- | --- |
| 1-Stage Accurate | No | No | Yes | Yes |
| No | 138 (55.2%) | 209 (56.5%) | 25 (6.8%) | 31 (12.4%) |
| Yes | 81 (32.4%) | 136 (36.8%) | 0 | 0 |

The Distributions of Error Distances are shown in Table 5 below.

TABLE 5

| Quantile | 1-Stage | 2-Stage Zip + 4 |
|---|---|---|
| Max | 4840.98 | 4840.85 |
| 99 | 2109 | 2110.07 |
| 95 | 1041.95 | 1041.94 |
| 90 | 425.5 | 425.39 |
| 75 | 14.25 | 13.99 |
| 50 | 3.83 | 3.1 |
| 25 | 0 | 0 |
| 10 | 0 | 0 |
| 5 | 0 | 0 |
| 1 | 0 | 0 |
| Min | 0 | 0 |

As used herein, the transitional term "comprising" is synonymous with "including" "containing" or "characterized by" and is inclusive or open-ended. "Comprising" does not exclude additional, unrecited elements or method steps. The transitional phrase "consisting of" is close-ended and excludes any element, step, or ingredient not specified in the claim. The transitional phrase "consisting essentially of" is inclusive of additional immaterial elements and those that do not materially affect the basic and novel characteristic(s)" but excludes other elements from having any essential significance to the combination.

It should also be noted that the terms "first", "second", "third", "upper", "lower", and the like can be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes can be made and equivalents can be substituted for elements thereof without departing from the scope of the present disclosure. In addition, many modifications can be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A computer system for determining population movement, the system comprising:
   a processor; and
   a tangible memory storage having instructions that cause the computer system to:
   receive only transaction records that do not have residential zip codes of the card holder from a transaction concentrator for a payment card system, the transaction records being records obtained directly from a point of sale device at a brick-and-mortar store of a merchant, the transaction records comprising:
   a primary account number of a payment card holder, a date and time of payment transaction, a zip code of the merchant, and a merchant industry code;
   determine the residential zip code of the payment card holder from a predetermined number of most recent transactions from the transaction records, wherein the determination includes assigning a weighted value according to the merchant industry code of the transaction for each recent transaction and summing the weighted values by the zip code of the merchant, and wherein the determination evaluates and selects the zip code having the highest sum as a residential zip code of the payment card holder;
   identify long-term movements of the payment card holder from the transaction records;
   identify short-term movements of the payment card holder from the transaction records;
   classify the long-term movements of the payment card holder based on the transaction records;
   classify the short term movements of the payment card holder based on the transaction records;
   anonymize the transaction records to remove the primary account number and any personally identifying information of the payment card holder; aggregate the short-term movements and long-term movements by creating source-target zip code pairs; and
   generate a population movement database that is accessible by a user device that has credentials allowing access; and
   wherein the instructions further cause the computer system to output at least one product selected from the group consisting of: a heat map output to a display showing population movement, a time-lapse video output to a display showing population movement, and an alert transmitted to a user device when a threshold population change in a given geographic area occurs.

2. The computer system according to claim 1, wherein the predetermined number of most recent transactions is fifteen.

3. The computer system according to claim 1, wherein the transaction records are only for card-present transactions.

4. The computer system according to claim 3, wherein card-present transactions include magnetic stripe, smart chip and contactless payment methods.

5. The computer system according to claim 1, wherein the short-term movements include: tourism, business, commute to work and weekend activity.

6. The computer system according to claim 1, wherein the long-term movements include: long vacation, change in residence and education.

7. The computer system according to claim 1,
   wherein the transaction records further comprise an indication of whether the payment transaction is a card-present or card-not-present transaction, and
   wherein the instructions further cause the computer system to filter the transactions records to keep only card-present transactions.

8. The computer system according to claim 1, wherein the instructions further cause the computer system to augment the target zip code pairs with geographical data.

9. The computer system according to claim 1, wherein the population movement is determined by zip code, city, county, metro area, state and country.

10. A computer-implemented method for determining population movement, the method comprising:
   receiving only transaction records that do not have residential zip codes of the card holder from a transaction concentrator, the transaction records being records obtained directly from a point of sale device at a brick-and-mortar store of a merchant, the transaction records comprising: a primary account number of a payment card holder, a date and time of payment transaction, a zip code of the merchant, and a merchant industry code;
   determining the residential zip code of the payment card holder from a predetermined number of most recent transactions from the transaction records, wherein the determination includes assigning a weighted value according to the merchant industry code of the transaction for each recent transaction and summing the weighted values by the zip code of the merchant, and wherein the determination evaluates and selects the zip code having the highest sum as a residential zip code of the payment card holder;

identifying long-term movements of the payment card holder from the transaction records;

identifying short-term movements of the payment card holder from the transaction records;

classifying the long-term movements of the payment card holder based on the transaction records;

classifying the short term movements of the payment card holder based on the transaction records;

anonymizing the transaction records to remove the primary account number and any personally identifying information of the payment card holder; aggregating the short-term movements and long-term movements by creating source-target zip code pairs; and generating a population movement database that is accessible by a user device that has credentials allowing access; and outputting at least one product selected from the group consisting of: a heat map output to a display showing population movement, a time-lapse video output to a display showing population movement, and an alert transmitted to a user device when a threshold population change in a given geographic area occurs.

11. The computer-implemented method according to claim 10, wherein the predetermined number of most recent transactions is fifteen.

12. The computer-implemented method according to claim 10, wherein the transaction records are only for card-present transactions.

13. The computer-implemented method according to claim 12, wherein card-present transactions include magnetic stripe, smart chip and contactless payment methods.

14. The computer-implemented method according to claim 10, wherein the short-term movements include: tourism, business, commute to work and weekend activity.

15. The computer-implemented method according to claim 10, wherein the long-term movements include: long vacation, change in residence and education.

16. The computer-implemented method according to claim 10,
wherein the transaction records further comprise an indication of whether the payment transaction is a card-present or card-not-present transaction; and
further comprising: filtering the transactions records to keep only card-present transactions.

17. The computer-implemented method according to claim 10, further comprising:
augmenting the target zip code pairs with geographical data.

18. The computer-implemented method according to claim 10, wherein the population movement is determined by zip code, city, county, metro area, state and country.

* * * * *